(No Model.)

F. BECKER.
Device for Amusement and Instruction.

No. 233,198.        Patented Oct. 12, 1880.

Witnesses:
E. G. Day,
John Cadwell.

Inventor:
FRED.<sup>K</sup> BECKER,
by
William N. Low,
Attorney.

UNITED STATES PATENT OFFICE.

FREDERICK BECKER, OF ALBANY, NEW YORK.

DEVICE FOR AMUSEMENT AND INSTRUCTION.

SPECIFICATION forming part of Letters Patent No. 233,198, dated October 12, 1880.

Application filed September 7, 1880. (No model.)

*To all whom it may concern:*

Be it known that I, FREDERICK BECKER, of the city and county of Albany, and State of New York, have invented a new and useful Device for Amusement and Instruction, of which the following is a specification.

My invention relates to a device for instructive amusement; and it consists in combining with a base-piece having near one of its edges the letters of the alphabet, either alone or with such other figures, phrases, or sentences as may be desired, a movable top-piece arranged to slide in guides on the top of the base-piece, and adapted to move an index or pointer pivoted to said base-piece and extending toward the letters, &c., marked thereon, all substantially as herein set forth.

Figure 1:
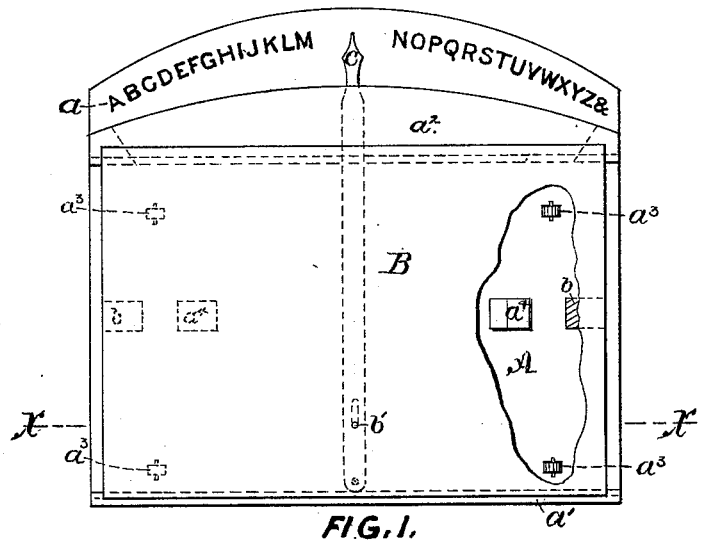
Figure 2:
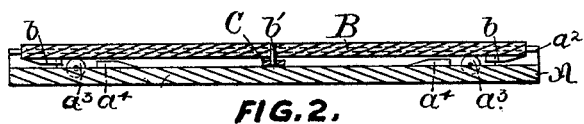
Figure 3:
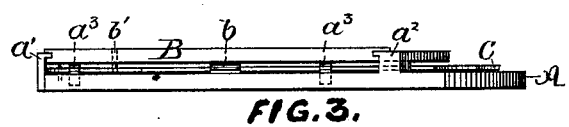

In the accompanying drawings, which form a part of this specification, and to which reference is herein made, Figure 1 is a plan view of my device with a portion of the top piece broken away to show some of the underlying parts; Fig. 2, a vertical section at the line $x\ x$, and Fig. 3 an end view.

As illustrated in the drawings, A is the base-piece of the device, usually made of wood, and having on its face, near one edge, an alphabet, $a$, or other suitable characters or words, preferably arranged in a curved line. The top piece, B, made of wood or other light material, is fitted to slide easily in the guides $a'$ and $a^2$, secured to the base-piece, and rides on the anti-friction rollers $a^3$, inserted in said base-piece. The sliding movement of the top piece is restricted by stops $a^4$ and $b$, secured, respectively, as indicated by their exponent letters, to the base-piece and top piece, the opposing pairs being arranged to engage and stop the movement of the top piece. An index or pointer, C, is pivoted to the base-piece at its inner end, and extends outward through a slotted opening under the guide $a^2$ until it reaches the letters at the edge of the base-piece. A pendent pin, $b'$, in the top piece engages in a slotted opening in the pointer C and connects the two together, so that the pointer moves coincidently with the top piece.

This device is usually operated by two persons, by each placing one hand lightly on the top piece, B, and, in response to requests to spell words, answer questions, &c., their diverse efforts frequently produce great amusement for the spectators. It can also be utilized for the purpose of teaching children to spell words. When so used one person may operate it.

I claim as my invention—

The combination, with the base-piece A, provided with an alphabet, $a$, or other characters, as herein described, of the sliding top piece, B, and pointer C, the latter being adapted to move coincidently with said top piece, as and for the purpose herein specified.

FREDERICK BECKER.

Witnesses:
 WILLIAM H. LOW,
 D. W. SEELEY.